J. JARRETT.
RAKE.
APPLICATION FILED MAR. 7, 1916. RENEWED AUG. 17, 1917.
1,260,906. Patented Mar. 26, 1918.
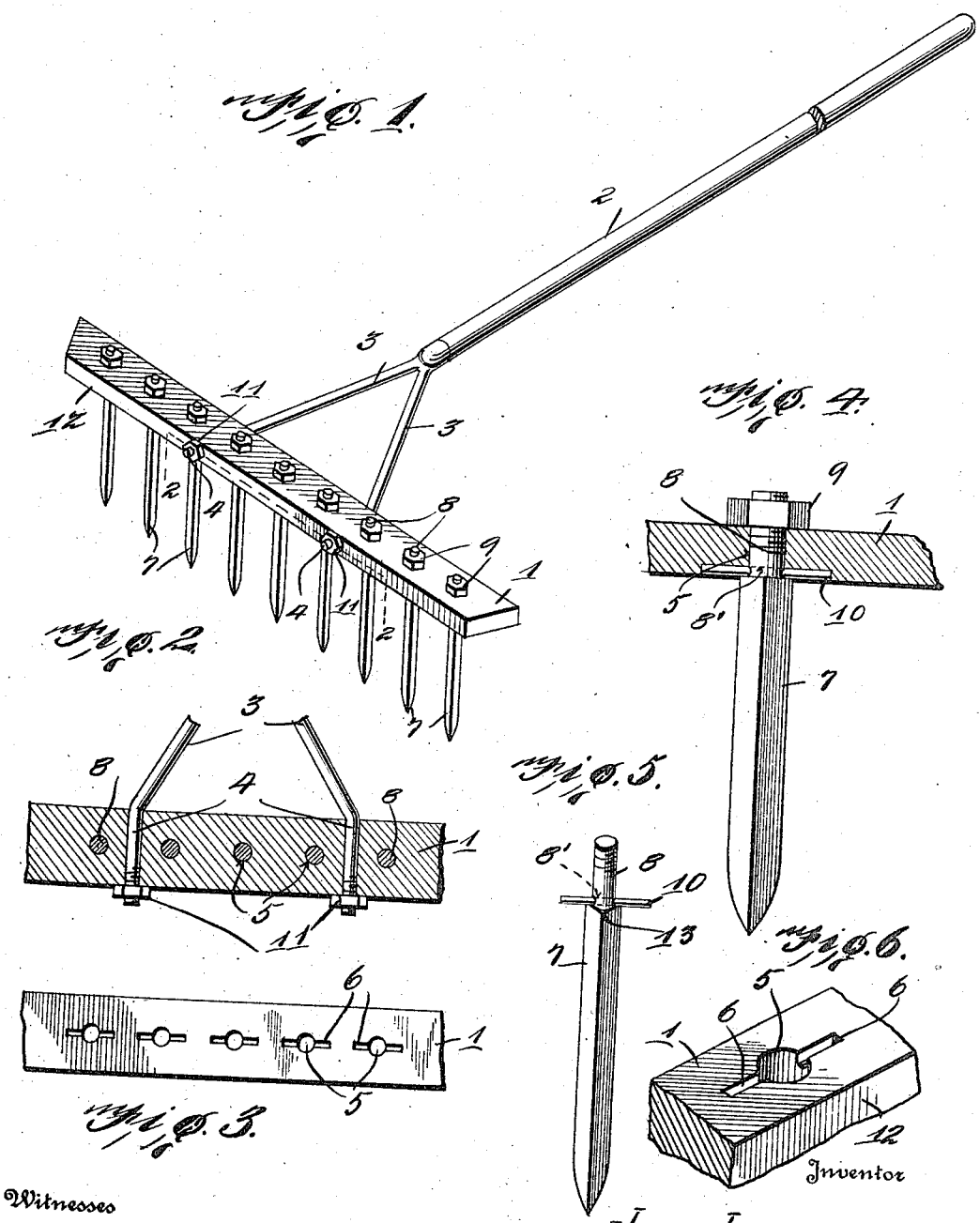

UNITED STATES PATENT OFFICE.

JORDAN JARRETT, OF RIPLEY, TENNESSEE, ASSIGNOR OF ONE-HALF TO JAMES E. GRAVES, OF RIPLEY, TENNESSEE.

RAKE.

1,260,906.  Specification of Letters Patent.  Patented Mar. 26, 1918.

Application filed March 7, 1916, Serial No. 82,690. Renewed August 17, 1917. Serial No. 186,819.

*To all whom it may concern:*

Be it known that I, JORDAN JARRETT, a citizen of the United States of America, residing at Ripley, in the county of Lauderdale and State of Tennessee, have invented certain new and useful Improvements in Rakes, of which the following is a specification, reference being had therein to the accompanying drawing.

This invention relates to rakes and has for its principal object the production of a rake provided with easily detachable teeth.

Another object of this invention is to provide a simple and efficient means to prevent rotary movement of the teeth so that any tendency of the teeth to disengage themselves from the nuts will be obviated.

With these and other objects in view this invention consists of certain novel combinations, constructions, and arrangements of parts as will be hereinafter fully described and claimed.

In the accompanying drawing:

Figure 1 is a detail perspective view of the rake.

Fig. 2 is a section taken on the line 2—2 of Fig. 1.

Fig. 3 is a fragmentary bottom plan view of the rake bar.

Fig. 4 is a side elevation of the rake tooth showing a fragmentary section through the rake bar.

Fig. 5 is a detail perspective of the rake tooth and pin.

Fig. 6 is a fragmentary inverted detail perspective of the rake bar.

Referring to the accompanying drawing by numerals it will be seen that the handle 2 carries the bar 1 by means of the Y-shaped fork 3. The end portions 4 of the fork 3 extend through the bar 1 at right angles to the edges 12 of the bar 1 as is clearly shown in Fig. 2 of the drawings, and are held in engagement with the bar 1 by the nuts 11.

The bar 1 is provided with the cylindrical vertical openings 5 and the alined grooves 6 on both sides of the openings 5 and extending parallel with the edges 12 of the bar 1. By referring to Figs. 4 and 6 of the drawing it will be seen that the grooves are formed in the lower surface of the bar 1 and terminate with a half cylindrical top portion.

By referring to Figs. 4 and 5 it will be seen that the reduced necks 8 of the teeth 7 are provided with openings 8' adjacent the top shoulders 13 of the teeth 7, these openings being adapted to receive the pin 10. These pins 10 are adapted to fit snugly in the slots 6 when the teeth 7 are attached to the bar 1 by means of the nuts 9 which are carried by the outer ends of the necks 8, so as to prevent any accidental rotation of the teeth. Although the pins are slidably mounted in the openings 8' any danger of their accidental displacement when in use is prevented, since the pins engage the rake bar 1 at the ends of the grooves 6.

From the foregoing description it will be seen that a simple and efficient rake has been produced whereby the several parts may be easily detached from engagement with one another or may be easily assembled when desired.

What is claimed is:

1. In a device of the class described, the combination of a handle, a bar carried by said handle, said bar provided with vertical cylindrical openings, grooves formed in the lower surface of said bar on both sides of said openings, teeth provided with reduced threaded necks adapted to extend through said openings, nuts carried by said necks, pins mounted through said necks, said pins fitting wholly within said grooves, whereby said pins will be protected from being bent or otherwise injured.

2. In a device of the class described, the combination of a handle, a bar carried by said handle, said bar provided with vertical cylindrical openings, grooves formed in the lower surface of said bar on both sides of said openings and extending parallel with the edge portions of said bar, teeth provided with reduced threaded necks, said necks being substantially cylindrical-shaped and extending through said openings, nuts carried by said necks, pins slidably mounted through said necks, said pins fitting within said grooves, the ends of said pins engaging said bar at the ends of said grooves, whereby said pins are held against displacement, whereby said teeth are held against rotation, thus preventing the displacement of said nuts accidentally.

In testimony whereof I hereunto affix my signature.

JORDAN $\overset{\text{his}}{\times}$ JARRETT.
$\phantom{JORDAN}{}_{\text{mark}}$ Witnesses to the mark of Jordan Jarrett:
ROY ROBERSON,
JAMES G. ROSS.

Copies of this patent may be obtained for five cents each, by addressing the "Commissioner of Patents, Washington, D. C."